United States Patent
Jonas

(10) Patent No.: US 7,241,103 B2
(45) Date of Patent: Jul. 10, 2007

(54) METHOD AND SYSTEM FOR ADJUSTING A POSITION OF AN OBJECT

(75) Inventor: Matthew Jonas, Allen, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/555,901

(22) Filed: Nov. 2, 2006

(65) Prior Publication Data

US 2007/0071588 A1 Mar. 29, 2007

Related U.S. Application Data

(62) Division of application No. 10/951,044, filed on Sep. 24, 2004.

(51) Int. Cl.
*B21C 47/24* (2006.01)

(52) U.S. Cl. ............... 414/816; 414/774; 414/775; 414/779; 414/783; 73/1.75; 702/94

(58) Field of Classification Search ........ 414/778–776, 414/779, 781–784, 816; 73/1.75; 702/94, 702/150–153; 901/16–18, 31, 33, 50
See application file for complete search history.

(56) References Cited

U.S. PATENT DOCUMENTS

| | | | |
|---|---|---|---|
| 3,064,547 A | 11/1962 | Humphries | |
| 3,931,747 A | 1/1976 | Erspamer | 74/5.34 |
| 4,136,844 A * | 1/1979 | Maudal | 244/3.2 |
| 4,267,737 A | 5/1981 | O'Connor et al. | 74/5.47 |
| 4,417,845 A | 11/1983 | Burton | 414/733 |
| 4,686,771 A | 8/1987 | Beveventano et al. | 33/324 |
| 4,712,974 A | 12/1987 | Kane | 414/757 |
| 4,911,385 A * | 3/1990 | Agrawal et al. | 244/165 |
| 5,142,211 A | 8/1992 | Tan | 318/568.1 |
| 5,175,600 A | 12/1992 | Frank et al. | 356/153 |
| 5,598,207 A | 1/1997 | Kormos et al. | 348/148 |
| 6,082,678 A * | 7/2000 | Maute | 244/169 |

(Continued)

OTHER PUBLICATIONS

Notification of Transmittal of the International Search Report and the Written Opinion of the International Searching Authority or the Declaration, International Application No. PCT/US2005/033804, Raytheon Company, International filing date: Sep. 20, 2005, 10 pages.

*Primary Examiner*—Douglas A. Hess
(74) *Attorney, Agent, or Firm*—Baker Botts L.L.P.

(57) ABSTRACT

According to one embodiment of the present invention, a method for adjusting a position of an object to compensate for tilt includes providing a rotatable base supporting an object and directing the object relative to the base such that the position of the object is controlled relative to a first axis. The object is stabilized along a second axis. The object is positioned relative to the base using first and second bearing arms. The first and second bearing arms movably couple the object to the base at a first position relative to a third axis and a fourth axis. The first bearing arm couples to the object at a first pivot point. The second bearing arm coupled to the object at a second pivot point. Each bearing arm includes a first portion and a second portion, which are coincident with the third axis and fourth axis, respectively. The object is adjusted to a second position using the first and second bearing arms to maintain the first axis when a tilt angle of the base is detected.

17 Claims, 2 Drawing Sheets

U.S. PATENT DOCUMENTS

| | | |
|---|---|---|
| 6,099,217 A | 8/2000 | Wiegand et al. ............. 409/201 |
| 6,264,145 B1 * | 7/2001 | Maute ...................... 244/171.1 |
| 6,606,154 B1 | 8/2003 | Oda ........................... 356/244 |
| 6,814,163 B2 | 11/2004 | Kuckes ........................ 175/45 |
| 6,986,636 B2 | 1/2006 | Konig et al. ................. 414/763 |
| 7,032,495 B2 | 4/2006 | Moser et al. ................. 89/203 |
| 7,086,307 B2 | 8/2006 | Gosselin et al. ......... 74/490.06 |
| 7,107,168 B2 | 9/2006 | Oystol et al. ................. 702/94 |

* cited by examiner

METHOD AND SYSTEM FOR ADJUSTING A POSITION OF AN OBJECT

RELATED APPLICATIONS

This application is a divisional of U.S. application Ser. No. 10/951,044, filed Sept. 24, 2004 entitled "Method and System for Adjusting a Position of an Object."

TECHNICAL FIELD OF THE INVENTION

This invention relates generally to the field of mechanics and more specifically to a method and system for adjusting a position of an object to compensate for tilt.

BACKGROUND OF THE INVENTION

In combat or other information gathering situations, a sensor package or other object mounted on a vehicle or vessel in motion may be used to obtain location or other information about the environment or an identified target. Alternatively, the object may be used to sight on the target for long-range firing or other purposes. Accordingly, the sensor package or other object may establish a line of sight with the identified target, which may be located some distance from the sensor package or other object, or another generally horizontal field.

While the information is being obtained or weaponry is being engaged, the line of sight directed at the identified target must be maintained. Such sensor packages and objects, however, are typically supported on a moving vehicle, aircraft, or other vessel. As the supporting machinery moves along the uneven surface of the ground, air, or sea, changes in pitch, roll, or elevation may cause the line of sight with the identified target or other horizontal field to be broken if the resulting change in the position of the sensor or other object is not compensated for.

Typical sensors and other objects are mounted with gimbal systems that operate to adjust the position of the sensor package or other object along two or more axes. In such gimbal systems, however, the mounting system of the gimbal are typically bulky structures that encircle or at least partially encircle the sensor package or other object. Additionally, each of the two or more degrees of freedom provided by the gimbal are orthoganol to each other and operate independently of every other axis. Because the mounting system must be adjusted to adjust the position of the sensor package or other object, a great deal of mass must be repositioned to maintain or realign the line of sight with the identified target. Additionally, such systems may at least partially obstruct the view of the sensor package or other object and/or may impact the usability of the sensor data.

SUMMARY OF THE INVENTION

In accordance with the present invention, a method and system for directing an object are provided that substantially eliminate or reduce the disadvantages and problems associated with previously developed systems and methods.

According to one embodiment of the present invention, a method for adjusting a position of an object to compensate for tilt includes providing a rotatable base supporting an object and directing the object relative to the base such that the position of the object is controlled relative to a first axis. The object is stabilized along a second axis. The object is positioned relative to the base using first and second bearing arms. The first and second bearing arms movably couple the object to the base at a first position relative to a third axis and a fourth axis. The first bearing arm couples to the object at a first pivot point. The second bearing arm coupled to the object at a second pivot point. Each bearing arm includes a first portion and a second portion, which are coincident with the third axis and fourth axis, respectively. The object is adjusted to a second position using the first and second bearing arms to maintain the first axis when a tilt angle of the base is detected.

Depending on the specific features implemented, particular embodiments of the present invention may exhibit some, none, or all of the following technical advantages. A technical advantage of one embodiment is that the position of an object may be adjusted by rotating the object about a deroll axis to reposition the object to compensate for tilt. Specifically, in certain embodiments, the object may be supported in a first position that is skewed relative to an elevation axis. Because the angle between the elevation axis and the deroll axis is less than ninety degrees, in particular embodiments, a technical advantage may be that object is mounted on a smaller structure than other mass derolls.

A further technical advantage of one embodiment may be that the object is supported at two corresponding pivot points rather than by a collar or other encircling mounting system. Another technical advantage may be that the collarless mounting system is substantially lighter and stiffer than collared mounting systems. As a result, less mass must be moved to maintain the line of sight of the object. Still another technical advantage may be that the collarless mounting system increases the unobstructed sensor surface area that may be used for obtaining sensor data.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
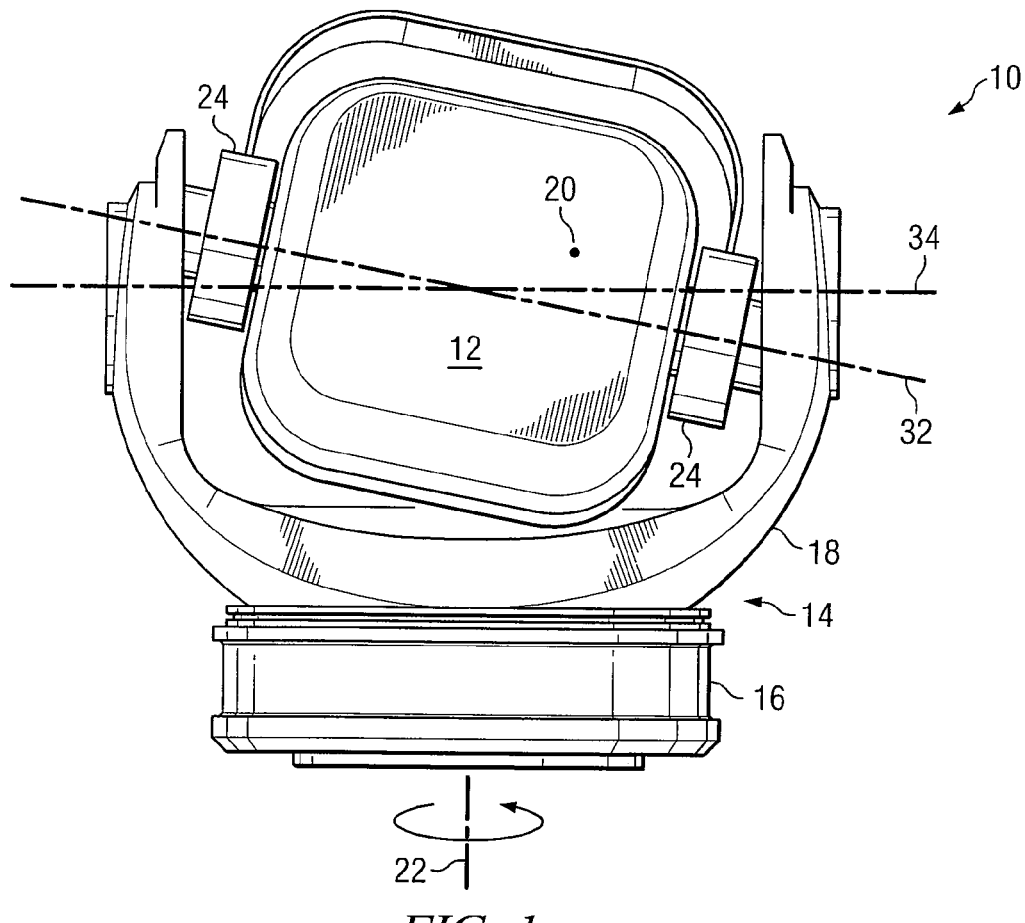
FIG. 1 illustrates one embodiment of a system for adjusting the position of an object according to the present invention.

FIG. 1 illustrates one embodiment of a system 10 for adjusting the position of an object 12. In the illustrated embodiment, object 12 comprises a sensor package that may include, for example, an electro-optical infrared sensor such as that was offered for sale under the name Future Combat Systems Medium Range EO/IR Sensor (SCLIN 0001) and offered by Raytheon the assignee of this patent application. Future applications may include Reconnaissance, Surveillance, and Target Acquisition (RSTA) Electro-Optical sensors. Thus, object 12 may include appropriate circuitry for image or thermal sensory. Additionally, object 12 may include circuitry appropriate for establishing a line of sight with a target located some distance from object 12 or another generally horizontal field.

Although an image sensor is illustrated, it is recognized that object 12 may include any object which may be directed at or sighted on a target. For example, object 12 may include any object appropriate for gathering information about an identified target. In particular embodiments, object 12 may be used in combat situations. For example, object 12 may be used in ground-based, air-based, and sea-based combat applications. Example combat uses for object 12 as described in this document, however, are merely provided as example applications for the use of object 12. It is recognized that object 12 may be used in any application requiring the sustained maintenance of a line of sight or other generally horizontal field with an identified target.

In various embodiments, object 12 may be coupled to or supported by any of a variety of vehicles, machinery, or other object stationary or in motion. For example, in a combat situation, object 12 may be coupled to an automobile, a tank, a ship, a helicopter, or an airplane. Because such objects typically do not stay on a steady horizontal course, it may become necessary for the line of sight established by object 12 on an identified target to be reestablished. For example, the vehicle or other machinery supporting object 12 may become tilted as the machinery travels along a surface or through the air. The changes in pitch or roll of the machinery may cause the line of sight of object 12 to be moved from the identified target or the generally horizontal field to otherwise be altered. Because object 12 has three cooperating degrees of freedom, however, object 12 may be automatically and mechanically repositioned such that the line of sight, or other horizontal field, is maintained or reestablished by object 12 and directed at the target.

As illustrated, object 12 is supported on a rotatable base 14 that may be mounted on the turret of a vehicle or other movable machine. In particular embodiments, base 14 includes a base support 16 and a base cradle 18. Base cradle 18 is rigidly fixed to base support 16 and includes two opposing arms to couple to opposing sides of object 12. In particular embodiments, the two opposing arms may couple to object 12 at two opposing pivot points located on opposing sides of object 12. As will be described in more detail below, base support 16 is rotatable relative to the machinery on which base 14 is mounted. Because base cradle 18 is rigidly fixed to base support 16, however, the rotation of base support 16 relative to the vehicle or other supporting machinery causes the rotation of base cradle 18 and, thus, object 12, which is supported thereon. Because object 12 is coupled to base 14 at the two opposing pivot points, object 12 is coupled to base 14 and, thus, mounted on any supporting machinery using a collarless mounting system. As a collarless mounting system, system 10 may provide a smaller structure than other mass derolls. As a result, system 10 is substantially lighter and stiffer than collared mounting systems, and less mass must be moved to maintain first axis 20 when base 14 encounters tilt. Additionally, the unobstructed sensor surface area that may be used for obtaining sensor data may be substantially increased.

System 10 includes a director or controller, not illustrated, that operates to control the position of object 12 and the movement of all axes. For example, the director may control the rotation of object 12 about first axis 20 defined by object 12. As illustrated, first axis 20 extends outward from object 12 in a direction that is substantially perpendicular to the page. In particular embodiments, first axis 20 may include a line of sight or other generally horizontal field defined by or established by or established by object 12. The position of object 12 may be controlled relative to this line of sight or horizontal field.

Base 14 also operates to control the position of object 12 about a second axis 22. Object 12 may be stabilized with respect to second axis 22. In particular embodiments, second axis 22 is an azimuth axis which defines 360 degrees of rotation. Base cradle 18 couples to base support 16 to establish second axis 22 rotation with respect to the vehicle. Base cradle 18 may be rotated about second axis 22 to enable object 12 to also rotate 360 degrees about second axis 22. Thus, where object 12 comprises a sensor package mounted on the turret of a combat vehicle, the sensor package may be rotated 360 degrees relative to azimuth axis 22. As a result, first axis 20, or the line of sight defined by object 12, may be directed at and aligned with any target on any side of the combat vehicle. The rotation of object 12 about second axis 22 represents a first degree of freedom.

Figure 2:
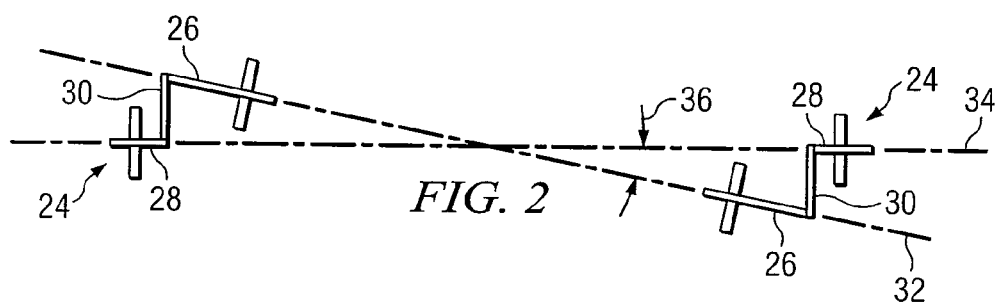
FIG. 2 illustrates one embodiment of a bearing arm that may be used in the system of FIG. 1.

Two bearing arms 24 movably couple object 12 to base 14 in a manner that results in object 12 being movable with respect to at least two additional cooperating degrees of freedom. Two bearing arms 24 couple object 12 to base 14 at two respective and opposing pivot points on either side of object 12. Thus, bearing arms 24 cooperate to render object 12 moveable with respect to the at least two additional cooperating degrees of freedom with respect to the two opposing pivot points on either side of object 12. An example configuration of bearing arms 24 is illustrated in more detail in FIG. 2. Each of bearing arms 24 include a first portion 26 and a second portion 28. "Each" refers to each member of a set or each member of a subset of the set. First and second portions 26 and 28 are rigidly fixed to one another. In the illustrated embodiment, a third portion 30 rigidly fixes first and second portions 26 and 28 such that each bearing arm 24 resembles a skewed "z". The configuration of bearing arms 24, as illustrated in FIG. 2, however, is merely one example embodiment of bearing arms 24. It is generally recognized that bearing arms 24 may be of an appropriate configuration for movably coupling object 12 to base 14. For example, in some embodiments third portion 30 may be unnecessary, and first and second portions 26 and 28 may be rigidly fixed directly to one another in an appropriate angle for aligning object 12 at a desired position respective to base 14.

As discussed above, bearing arms 24 couple object 12 to base 14. Accordingly, first portion 26 of each bearing arm 24 is coupled to object 12 on opposing sides of object 12 at opposing pivot points. First portion 26 is coincident with a third axis 32. In particular embodiments, third axis 32 comprises an elevation axis, about which object 12 may be rotated. For example, the elevation axis may extend along a plane that is substantially parallel to the page. Where object 12 comprises a sensor package mounted on the turret of a vehicle, third axis 32 may allow object 12 to be rotated 180 degrees relative to the horizon. Third axis 32 represents a second degree of freedom that cooperates with the first degree of freedom provided by second axis 22. Thus, first axis 20, or the line of sight or horizontal field, may be aligned with a target at any elevation respective to the vehicle or other machinery or structure supporting system 10.

Second portion 28 of each bearing arm 24 is coupled to base cradle 18. Second portion 28 is coincident with a fourth axis 34. Fourth axis 34 is skewed from third axis 32 by a deroll angle 36 and, therefore, comprises a deroll axis. As a result, bearing arms 24 support object 12 in a first position along fourth axis 34 that is skewed by deroll angle 36 relative to third axis 32. In particular embodiments, deroll angle 36 is skewed from third axis 32 by an amount within a range that is greater than zero degrees but less than 90 degrees. Because first and second portions 26 and 28 are coincident with third and fourth axes 32 and 34, respectively, and because bearing arms 24 couple to object 12 at opposing pivot points on opposing sides of object 12, object 12 is movable with respect to both third axis 32 and fourth axis 34 from common pivot points associated with object 12. In operation, bearing arms 24 may be used to adjust the position of object 12 from the first position to a second position when a tilt of base 14 is detected. The adjustment or repositioning of object 12 may include rotating object 12 about second axis 22 and third axis 32 in conjunction with fourth axis 34 to establish or maintain first axis 20. Accordingly, fourth axis 34 represents a third degree of freedom. Rotating object 12 about fourth axis 34 may induce a tilt between first axis 20 and base 14 to compensate for a vehicle induced tilt experienced by base 14 and, thus, object 12.

As discussed above, system 10 may include a director or controller that operates to control the position of object 12. The director or controller may adjust the position of object 12 from a first, unadjusted position to a second, adjusted position by moving bearing arms 24. The objective of repositioning object 12 is to substantially maintain the alignment of object 12 with first axis 20. More specifically and as described above with regard to FIG. 1, base 14 of system 10 may be mounted on a vehicle or other machine in a state of motion. A line of sight or other horizontal field such as first axis 20 may be established by object 12 and object 12 may be positioned appropriately. As the machinery on which system 10 is mounted travels along a surface or through the air, the machinery may encounter obstacles or elevation changes that cause the machinery to rise or fall relative to the horizon. Such changes in the elevation of the machinery with respect to the horizon, however, may alter the position of object 12 relative to the established line of sight or other generally horizontal field.

However, for strategic purposes it may be desirable for object 12 to maintain a substantially constant line of sight with the identified target. For example, it may be desirable for an object 12, which comprises a sensor package for producing image or thermal sensory information for a target located some distance from object 12, to maintain a substantially constant line of sight with the target or another generally horizontal field. Because bearing arms 24 enable object 12 to be rotated about both third axis 32 and fourth axis 34, bearing arms 24 may cooperate with base 14 to adjust object 12 to a second position to maintain first axis 20 when a tilt angle of base 14 is detected relative to the horizon or another fixed and substantially horizontal reference. Because bearing arms 24 cooperate to adjust the position of object 12 about third axis 32 and fourth axis 34 from common pivot points on opposing sides of object 12, however, the movement of object 12 with respect to either third axis 32 or fourth axis 34 results in a cooperative movement of object 12 with respect to the other cooperating axis as well.

For the maintenance of first axis 20, the controller or director discussed above may reposition object 12 with respect to each of the four axes. The movement of object 12 with respect to each axis is independently controlled by the controller or director. As stated above, however, because bearing arms 24 cooperate with two opposing arms of base cradle 18 to couple object 12 to base 14, however, the controller or director independently controls the position of object 12 with respect to third axis 32 and fourth axis 34 through the same two contact points. The movement of object 12 with respect to either axis results in a movement of object 12 about the cooperating axis. For example, adjustment of the position of object 12 with respect to third axis 32 results in the movement of object 12 with respect to fourth axis 34, and vice versa.

The amount of tilt for which bearing arms 24 may be able to compensate may be directly related to, or a function of, the amount by which fourth axis 34 is skewed from third axis 32. Thus, the amount of tilt for which bearing arms 24 may compensate may be directly related to deroll angle 36. As just one example, where object 12 is positioned such that fourth axis 34 is skewed from elevation axis 32 by an amount on the order of ten degrees, bearing arms 24 may cooperate to maintain first axis 20 when base 14 is tilted at any angle up to ten degrees. As another example, where fourth axis 34 is skewed from elevation axis 32 by an amount on the order forty-five degrees, bearing arms 24 may cooperate to maintain first axis 20 when base 14 is tilted at any angle up to forty-five degrees.

Figure 3:
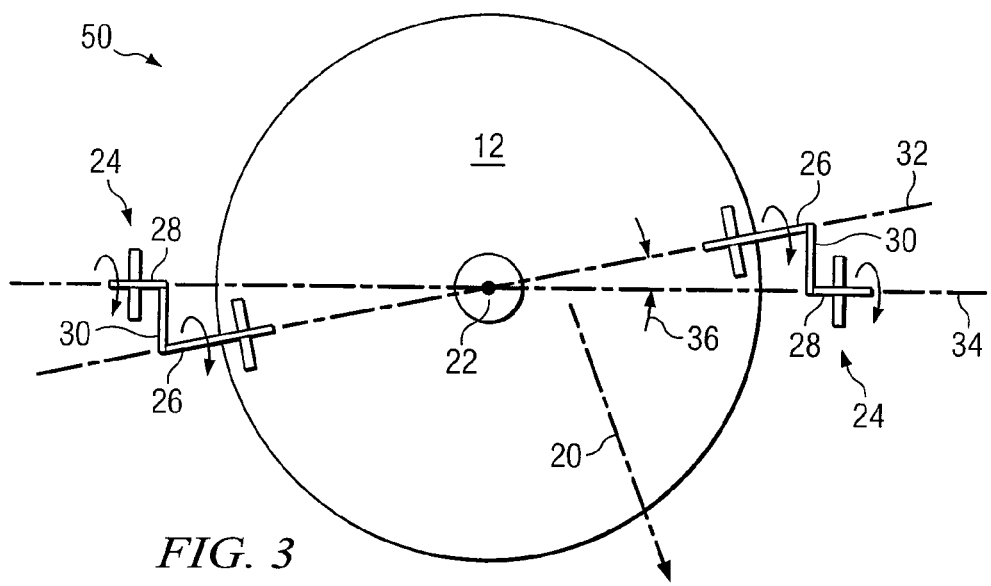
FIG. 3 illustrates a top view of one embodiment of an object with three cooperating degrees of freedom.

FIG. 3 illustrates a top view of one embodiment of object 12 with at least three degrees of freedom. Object 12 is illustrated in a first, unadjusted position 50. Because FIG. 3 is a top view of object 12, first axis 20 is illustrated as being generally parallel to the page and second axis 22 is illustrated as being generally perpendicular to the page. The position of object 12 relative to first axis 20 and second axis 22 is controlled by base 14. In first, unadjusted position 50, object 12 is positioned at a skewed angle relative to base cradle 18. The skew of object 12 is determined by deroll angle 36 and thus the relation of fourth axis 34 and third axis 32. While object 12 is in first, unadjusted position 50, first axis 20, which may comprise a line of sight or other generally horizontal field, is directed at an identified target located some distance from object 12. Because second axis 22 allows for the rotation of object 12 in 360 degrees, the identified target may be on any side of the machinery on which system 10 is mounted. Because third axis 32 allows for the further rotation of object 12 about third axis 32, the identified target may also be at any elevation relative to object 12 or relative to the combat vehicle on which object 12 is mounted.

Tilting of the vehicle or other machinery on which object 12 is mounted is related to the change in elevation of the machinery. As the machinery moves, the machinery and, thus, base 14 on which object 12 is mounted may be tilted such that base 14 is no longer substantially horizontal. As a result of the tilting, first axis 20 may be redirected away from the initial target. Accordingly, the line of sight with the target or other generally horizontal field may be broken. The director of system 10 may detect the tilting of base 14 and operate to reestablish the line of sight or generally horizontal field. In particular embodiments, the director of system 10 may receive global position satellite (GPS) information and determine the tilt angle of base 14 from the GPS information. Alternatively, system 10 may use a suitable orthogonal grouping of gyroscopes, a system of pendulums, or other suitable mechanism for establishing a fixed point of reference in space to determine the tilt angle of base 14. The position of object 12 may then be adjusted to reestablish or generally maintain the line of sight or other generally horizontal field of object 12 with the initial target even when base 14 is tilted at the detected tilt angle. As discussed above with regard to FIG. 2, the repositioning of object 12 may include adjusting bearing arms 24 to cooperatively adjust the position of object 12 relative to third axis 32 and fourth axis 34.

Figure 4:
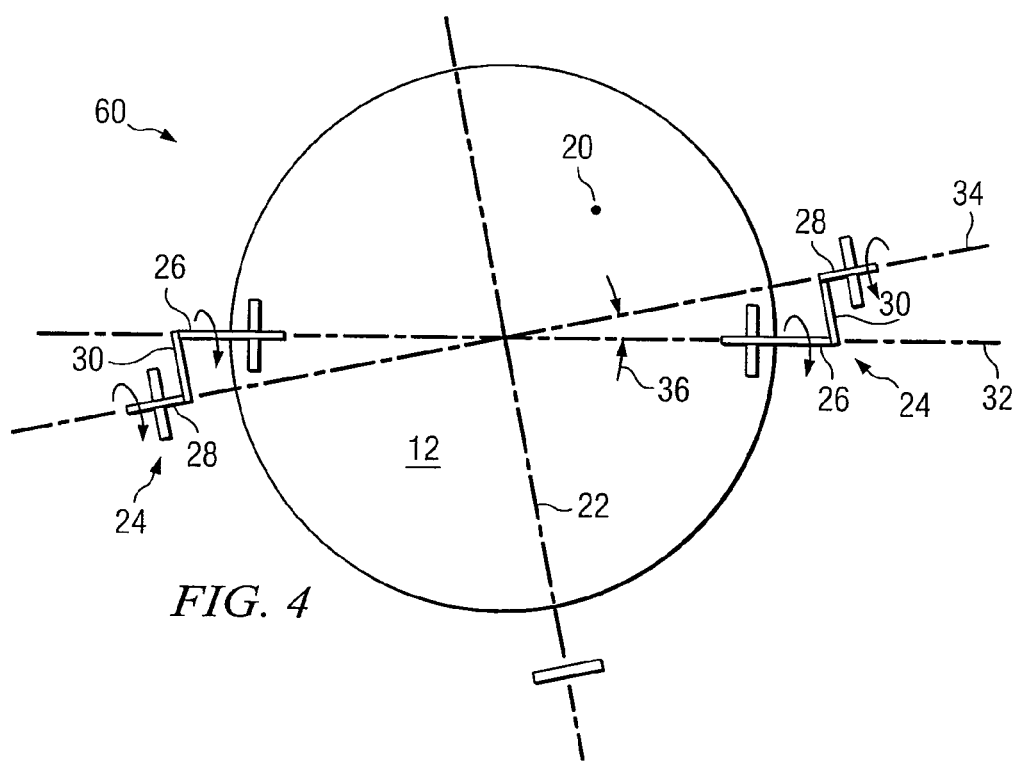
FIG. 4 illustrates a front view of one embodiment of an object with three cooperating degrees of freedom in an adjusted portion.

FIG. 4 illustrates a front view of one embodiment of object 12 with at least three degrees of freedom in a second, adjusted position 60. Because object 12 is illustrated as a front view, first axis 20 now extends in a direction that is generally perpendicular to the plane of the page. As described above, second, adjusted position 60 is obtained by adjusting bearing arms 24 an amount required to compensate for a tilt range of base 14 to substantially maintain a line of sight or other generally horizontal field with an identified target. Specifically, bearing arms 24 may be automatically and mechanically rotated about fourth axis 34 relative to base 14. The rotation of bearing arms 24 about fourth axis 34 results in the rotation of third axis 32 about fourth axis 34. In this manner, bearing arms 24 and base 14 may cooperate to compensate for the tilt angle detected by the director of base 14 by adjusting bearing arms 24 relative to the pivot points at which bearing arms 24 couple object 12 to base 14.

The amount of tilt for which bearing arms 24 are able to compensate is related to deroll angle 36. Specifically, deroll angle 36 determines the maximum amount of tilt for which bearing arms 24 may be used to maintain first axis 20. As a first example, object 12 may be positioned such that object 12 is skewed relative to third axis 32 by a deroll angle 36 on the order of ten degrees. Because the amount of tilt for which bearing arms 24 may compensate is determined by deroll angle 36, bearing arms 24 are adjustable to compensate for a maximum of ten degrees of tilt in this example. Accordingly, if base 14 experiences a tilt of ten degrees or less, bearing arms 24 may be used to reposition object 12 in second, adjusted position 60 to maintain first axis 20. If base 14 experiences a tilt of more than ten degrees, however, object 12 may not be repositioned to maintain first axis 20. Rather, for a tilt angle that is greater than deroll angle 36, the line of sight with the target or other generally horizontal field must be at least partially reestablished manually.

Figure 5:
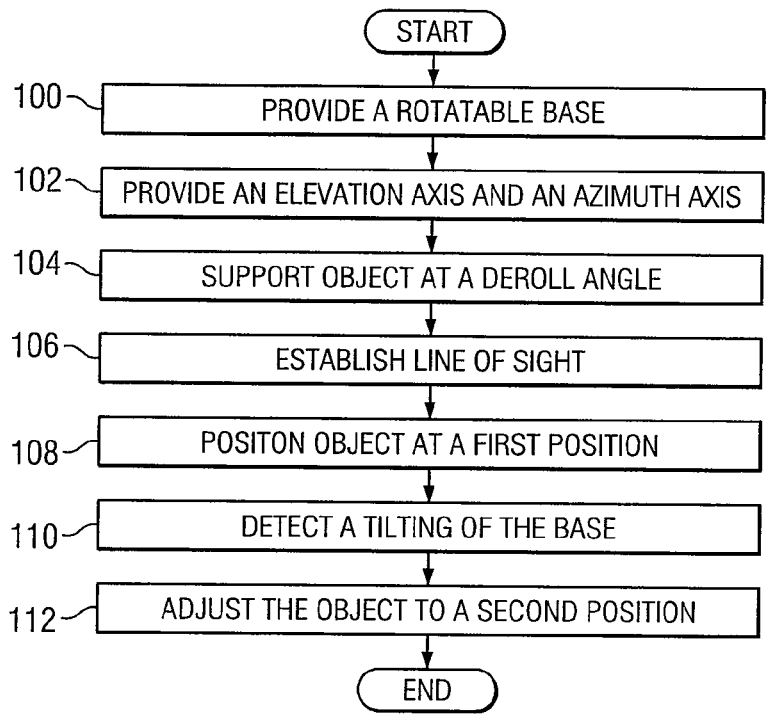
FIG. 5 is a flowchart of one embodiment of a method for adjusting the position of an object according to the present invention.

FIG. 5 is a flowchart of one embodiment of a method for adjusting the position of object 12 according to the present invention. At step 100, a rotatable base 14 is provided. As discussed above, base 14 may comprise a base support 16 and a base cradle 18 and may be supported on any of a variety of combat vehicles or machinery. For example, base 14 may be supported on a tank, an airplane, a ship, or other vessel or machine and may be in a state of motion. In particular embodiments, base 14 couples to object 12 using a collarless-mounting system that provides adjustment of object 12 from two pivot points on opposing sides of object 12. At step 102, second axis 22, or an azimuth axis, and third axis 32, an elevation axis, are provided.

At step 104, an object 12 is supported on base 14 at deroll angle 36. Object 12 may be supported on base 14 by the two opposing arms of base cradle 18 that are each coupled to opposing sides of object 12, respectively. In the supported position on base 14, object 12 may be stabilized along second axis 22 and third axis 32. In particular embodiments, object 12 may also be stabilized along an azimuth axis that provides a first degree of freedom of 360 degrees.

At step 106, a line of sight is established. Where, for example, object 12 comprises a sensor package operable to perform image sensory, the target may include a person, a military vehicle, or other appropriate target. Once a line of sight to a target is established, object 12 is positioned at first position 50 at step 108. Object 12 may be positioned in first position 50 relative to base 14 by moving or repositioning bearing arms 24. The position of bearing arms 24 and, consequently, object 12 is controlled relative to first axis 20. In particular embodiments, first axis 20 may include a line of sight or other generally horizontal field that is directed at the identified target. Accordingly, positioning object 12 in first position 50 may include rotating object 12 about second axis 22, which may comprise an azimuth axis in particular embodiments. Additionally, first position 50 may include object 12 positioned relative to third axis 32 and fourth axis 34, which may comprise, in particular embodiments, an elevation axis and a deroll axis, respectively.

At step 110, a tilting of base 14 is detected. As described above, the tilting of base 14 may result from a change in pitch, roll, or elevation of the machinery on which base 14 and, thus, object 12 is mounted. For example, if base 14 is mounted on a tank, the surface on which the tank is moving may be uneven and cause the line of sight or other generally horizontal field of object 12 to be moved from the identified target. Accordingly, in response to a detection of a tilting of base 14, the position of object 12 may be adjusted to a second position to compensate for the tilting of base 14 at step 112. Specifically, bearing arms 24 may be rotated to adjust object 12 to second position 60 to maintain first axis 20 even when of base 14 is tilted. Accordingly, object 12 may be rotated about third axis 32 and fourth axis 34, which cooperate to remove the tilt. Additionally, second axis 22 and third axis 32 may be adjusted to substantially maintain first axis 20. Thus, the line of sight or other generally horizontal field of object 12 may be maintained on the identified target even though base 14 and object 12 are in a state of motion.

Because object 12 is coupled to base 14 at two opposing pivot points on opposing sides of object 12, base 14 comprises a collarless mounting system, which provides a smaller structure than other mass derolls. As a result, system 10 is substantially lighter and stiffer than collared mounting systems, and less mass must be moved to maintain first axis 20 when base 14 encounters tilt. Additionally, the unobstructed sensor surface area that may be used for obtaining sensor data may be substantially increased.

Although example steps are illustrated and described, the present invention contemplates two or more steps taking place substantially simultaneously or in a different order. In addition, the present invention contemplates using methods with additional steps, fewer steps, or different steps, so long as the steps remain appropriate for adjusting the position of an object to generally maintain a line of sight or other generally horizontal field or axis.

Although an embodiment of the invention and its advantages are described in detail, a person skilled in the art could make various alterations, additions, and omissions without departing from the spirit and scope of the present invention as defined by the appended claims.

What is claimed is:

1. A method for adjusting a position of an object to compensate for tilt, comprising:
   providing a rotatable base supporting an object;
   directing the object relative to the base such that the position of the object is controlled relative to a first axis, the object stabilized along a second axis;
   positioning the object relative to the base using first and second bearing arms, the first and second bearing arms movably coupling the object to the base at a first position relative to a third axis and a fourth axis, the third axis perpendicular to the first axis, the base operable to control the rotation of the object about the second axis;

holding the object at first position at a deroll angle greater than zero degrees and less than ninety degrees relative to the third axis using the bearing arms, each bearing arm comprising a first portion and a second portion, the first portion coupled to the object and coincident with the third axis, the second portion to the base and coincident with the fourth axis; and adjusting the object to a second position using the first and second bearing arms to maintain the first axis when a tilt angle of the base is detected.

2. The method of claim 1, wherein directing the object relative to the base comprises directing a sensor package along the first axis at a target.

3. The method of claim 2, wherein the sensor package is operable to perform image sensory.

4. The method of claim 1, wherein the first and second portions of each bearing arm are rigidly fixed relative to one another.

5. The method of claim 1, wherein:
the first axis comprises a line of sight perpendicular to a target positioned some distance from the object;
the second axis comprises an azimuth axis representing a first degree of freedom;
the third axis comprises an elevation axis representing a second degree of freedom; and
the fourth axis comprises a deroll axis representing a third degree of freedom.

6. The system of claim 1, wherein the bearing arms are operable to compensate for an amount of tilt angle that is relative to the deroll angle.

7. The method of claim 1, further comprising coupling the base to a vehicle.

8. The method of claim 1, further comprising:
receiving global position satellite information at the base; and
detecting the tilt angle of the base based on the global position satellite information.

9. The method of claim 1, further comprising:
receiving information from a system of one or more gyroscopes; and
detecting the tilt angle of the base based on the information received from the system of one or more gyroscopes.

10. A method for adjusting a position of an object to compensate for tilt, comprising:
providing a rotatable base supporting an object;
directing the object relative to the base such that the position of the object is controlled relative to a first axis, the object stabilized along a second axis;
positioning the object relative to the base using first and second bearing arms, the first and second bearing arms movably coupling the object to the base at a first position relative to a third axis and a fourth axis, the first bearing arm coupling to the object at a first pivot point, the second bearing arm coupled to the object at a second pivot point, the third axis perpendicular to the first axis, the base operable to control the rotation of the object about the second axis;
holding the object at first position relative to the third axis using the bearing arms, each bearing arm comprising a first portion and a second portion, the first portion coupled to the object and coincident with the third axis, the second portion to the base and coincident with the fourth axis; and
adjusting the object to a second position using the first and second bearing arms to maintain the first axis when a tilt angle of the base is detected.

11. The method of claim 10, wherein directing the object relative to the base comprises directing a sensor package along the first axis at a target.

12. The method of claim 11, wherein the sensor package is operable to perform image sensory.

13. The method of claim 10, wherein the first and second portions of each bearing arm are rigidly fixed relative to one another.

14. The method of claim 10, wherein:
the first axis comprises a line of sight perpendicular to a target positioned some distance from the object;
the second axis comprises an azimuth axis representing a first degree of freedom;
the third axis comprises an elevation axis representing a second degree of freedom; and
the fourth axis comprises a deroll axis representing a third degree of freedom.

15. The method of claim 10, further comprising:
receiving global position satellite information at the base; and
detecting the tilt angle of the base based on the global position satellite information.

16. The method of claim 10, further comprising:
receiving information from a system of one or more gyroscopes; and
detecting the tilt angle of the base based on the information received from the system of one or more gyroscopes.

17. A method for adjusting a position of an object to compensate for tilt, comprising:
means for providing a rotatable base supporting an object;
means for directing the object relative to the base such that the position of the object is controlled relative to a first axis, the object stabilized along a second axis;
means for positioning the object relative to the base using first and second bearing arms, the first and second bearing arms movably coupling the object to the base at a first position relative to a third axis and a fourth axis, the third axis perpendicular to the first axis, the base operable to control the rotation of the object about the second axis;
means for holding the object at a first position at a deroll angle greater than zero degrees and less than ninety degrees relative to the third axis using the bearing arms, each bearing arm comprising a first portion and a second portion, the first portion coupled to the object and coincident with the third axis, the second portion to the base and coincident with the fourth axis; and
means for adjusting the object to a second position using the first and second bearing arms to maintain the first axis when a tilt angle of the base is detected.

* * * * *